Patented Aug. 8, 1950

2,517,965

UNITED STATES PATENT OFFICE 2,517,965

PURIFICATION OF CARBONIC ACID ESTERS

Lester E. Bohl, Akron, Ohio, assignor to Pittsburgh Plate Glass Company, Allegheny County, Pa., a corporation of Pennsylvania No Drawing. Application March 23, 1948, Serial No. 16,611

8 Claims. (Cl. 260—463)

This invention relates to a method of preparing carbonate and carbamate esters and in particular relates to a method of preparing carbonate and carbamate esters which are liquids.

In the preparation of a carbonate ester, a haloformate, such as a chloroformate, is reacted with a mono- or polyhydric saturated or unsaturated alcohol. In the preparation of a carbamate ester a haloformate is reacted with an amine. During the reaction for the production of such esters there is an evolution of hydrogen halide such as HCl which must be removed. Several methods have been provided to facilitate such removal.

For example, the process may be conducted in the presence of a strong basic agent including organic bases such as pyridine, dimethyl aniline, quaternary ammonium bases such as trimethyl phenyl ammonium hydroxide, or inorganic bases such as the oxides, hydroxides, carbonates and bicarbonates of sodium, potassium, barium, strontium, and magnesium or other alkaline earth metal or alkali metal which will react with and remove the HCl liberated.

Another method which may be used involves the use of an inert solvent, which is a nonsolvent for HCl, such as carbon tetrachloride or toluene, and heating at reflux temperature to drive off the HCl with the vaporizing solvent.

A difficulty involved in the preparation of the ester is that the resulting carbonate or carbamate ester contains an excessive amount of combined hydrolyzable chlorine. The exact manner in which the chlorine is combined is not yet fully determined but it appears to be present as residual chloroformate or chlorine which is directly attached to a carbonyl group. The removal of such chlorine is difficult particularly with carbonate and carbamate esters which are high boiling liquids, having a boiling point greater than 150° C., especially when they are prepared with a chloroformate, which also has a boiling point greater than 150° C. or which decomposes at temperatures greater than 150° C. In such cases, ordinary distillation processes are unsuitable for the removal of high boiling impurities. Washing the ester with an aqueous alkaline earth metal or alkali metal hydroxide, carbonate or bicarbonate solution such as NaOH will reduce the chloroformate chlorine somewhat but not enough for many purposes. Furthermore this operation is found to be unduly slow.

The term "chloroformate chlorine" or "haloformate halogen" as used herein means chlorine or halogen respectively which is determined by the method of analysis set forth below and which apparently is linked directly to a carbonyl group. For example, the chlorine present in the chloroformate

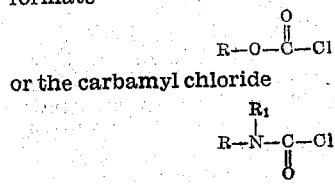

or the carbamyl chloride $$R-N(R_1)-C(=O)-Cl$$

is considered to be chloroformate chlorine within the meaning of the term as herein used.

The method of determining the chloroformate chlorine present in the carbonate or carbamate involves the formation of a pyridinium salt whose chlorine is ionically bound and therefore is available for titration as chloride ion. Fifty grams of the carbonate or carbamate are placed in a 250 milliliter beaker and 10 milliliters of a 20% pyridine solution (20 grams of pyridine mixed thoroughly with 80 milliliters of distilled water) are added. The mixture is stirred vigorously and then allowed to stand for five minutes with intermittent stirring. Fifty milliliters of distilled water are added and then 5 milliliters of 10% ferric nitrate solution are added. (The 10% ferric nitrate solution is prepared by dissolving 100 grams of chemically pure $Fe(NO_3)_3$ in 600 milliliters of distilled water, adding 25 milliliters of chemically pure concentrated $HNO_3$ (70.0% $HNO_3$ by weight) and diluting to one liter of final solution with distilled water.) The mixture is acidified with concentrated nitric acid (70.0% $HNO_3$ by weight) and cooled to room temperature.

The solution is then titrated with 0.1N standard silver nitrate until no more silver chloride is precipitated. An excess (2 milliliters or more) of 0.1N standard silver nitrate is added and the solution is stirred vigorously until the silver chloride coagulates. Then the excess silver nitrate is titrated with 0.1N standard potassium thiocyanate until a faint rust-red color persists. The calculations are made thus:

$$\%Cl = \frac{(\text{milliliters } AgNO_3 \times N_1) - (\text{milliliters } KCNS \times N_2) \times 0.03545 \times 100}{50}$$

where $N_1$=normality of the silver nitrate and $N_2$=normality of the potassium thiocyanate.

The present invention provides a novel method for preparing carbonate esters and N— substituted carbamate esters and for removing chloroformate chlorine from the carbonate and carbamate esters which is more rapid and more effective than previously used processes. It has been found, according to this invention, that such chlorine may be removed by contacting the carbonate or carbamate ester with ammonia after its formation and after the chloroformate has been substantially completely consumed. Thus in performance of this invention, a carbonate or carbamate ester is prepared for example by reaction of a chloroformate with an alcohol or an amine usually in the presence of a strong base as previously noted. The amount of base or alkaline agent added is at least sufficient in theory to react with all or substantially all of the HCl which may theoretically evolve. After the reaction is largely complete, the resultant carbonate or carbamate ester contains a residual quantity, for example from 1 to 5 per cent or even less by weight of chloroformate chlorine.

Where the reaction is conducted without the strong base, as for example by the use of the nonsolvent as above described, reflux is continued until the reaction is largely completed and then is treated as herein contemplated.

The term "ammonia" as herein used in the specification and in the claims is intended to mean ammonia ($NH_3$) and ammonium compounds such as ammonium hydroxide, ammonium carbonate, ammonium bicarbonate, etc. which will liberate ammonia for reaction with HCl.

A typical method of performing the invention involves its application with respect to the production of diethylene glycol bis (butoxyethyl carbonate). This may be accomplished by the reaction of diethylene glycol bis (chloroformate) with butoxyethyl alcohol in the presence of caustic soda while maintaining the reaction mixture at a temperature substantially below room temperature usually around 0° to 5° C.

In this typical reaction between the chloroformate and the alcohol, the reaction may be carried out to the point where the chloroformate chlorine content is about 1 to 5% by weight and further may be treated with NaOH or other alkali metal or alkaline earth metal oxide, hydroxide, carbonate or bicarbonate to reduce the chloroformate to a lower value, for example 1 to 2% or below. Then, in accordance with this invention, ammonia, usually in the form of aqueous ammonium hydroxide, bicarbonate or carbonate and in amount several times the theoretical equivalent of the chlorine concentration, is added to the mixture to reduce the chlorine concentration below about 0.1% by weight and preferably below 0.005%.

This invention may be applied to numerous other procedures for producing the carbonate esters. As an illustration it is applicable to processes wherein the chloroformate is added to a mixture of the basic reagent and the alcohol or where the alcohol is added to a mixture of the chloroformate and basic reagent.

The invention may be applied to the production of numerous carbonates or carbamates. It is particularly concerned with the high boiling esters which are prepared by reacting a polychloroformate such as a bischloroformate of a dihydric alcohol or dihydroxy compound with an alcohol or hydroxy compound.

Carbonates of monohydric alcohols, polyhydric alcohols or mixed carbonates of monohydric and polyhydric alcohols may be prepared. Such products will have the general structure

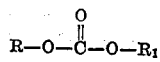

where R and $R_1$ are radicals of alcohols or hydroxy compounds $R(OH)_x$ containing an hydroxyl group which is esterifiable by acids. $x$ is a small whole number, usually being from 1 to 3.

The polyhaloformates of the following hydroxy compounds are suitable for the reaction: glycols or polyglycols such as the alkylene glycols, for example, ethylene glycol, trimethylene glycol, pentamethylene glycol, tetramethylene glycol, propylene glycol, etc., or the polyhydroxy ethers, polyglycols such as the di-, tri-, and tetra-, ethylene glycols and the di-, tri-, and tetra-, propylene glycols, polybutylene glycols, 1,2-dihydroxy-4-ethoxy butane, $\alpha\alpha$-dihydroxy diphenyl ether or other aromatic dihydroxy compounds such as resorcinol, phthalyl alcohol, etc.

The haloformates and preferably chloroformates of the above hydroxy compounds, may be reacted with various monohydric or polyhydric saturated or unsaturated alcohols such as methyl, ethyl, propyl, isopropyl, butyl or isobutyl alcohol, or other straight or branched chain paraffin alcohols including those of higher molecular weights such as stearyl, dodecyl, cetyl, and melissyl alcohols, or the aromatic alcohols such as benzyl, phenylethyl, etc. alcohols or unsaturated alcohols such as allyl, methallyl, crotyl, isocrotyl, cinnamyl, propargyl, tiglyl, or methyl vinyl carbinyl alcohols, citronellol, geraniol, and the higher molecular alcohols including oleyl and linoleyl alcohols, also substituted alcohols such as 2-chloroallyl, 2-bromoallyl, or chlorocrotyl alcohol, 3-chlorobutene 2-ol-1, or other halogen substituted alcohols.

Likewise polyhydric alcohols such as ethylene glycol, propylene glycol, butylene glycol, isobutylene glycol, trimethylene glycol, pentamethylene glycol, or the corresponding polyglycols such as di-, tri-, or tetraethylene glycol, or the corresponding propylene or butylene or isobutylene polyglycols, mannitol, sorbitol, polyvinyl alcohol, hydrated cellulose, cellulose monoacetate, cellulose monobutyrate, starch, sugars, aromatic alcohols, phthalyl alcohols, may be reacted with polychloroformates and residual chlorine removed in accordance with this invention. In addition, the invention may be applicable to hydroxy acids such as lactic, glycollic, tartaric, citric, hydroxy butyric, salicylic, vicinoleic acids or the esters of such acids. The more important of the chloroformates useful in the practice of this invention are those derived from the glycols and polyglycols.

Various compounds may be produced. Unsaturated esters such as ethylene glycol bis (allyl carbonate), ethylene glycol bis (methallyl carbonate), diethylene glycol bis (allyl carbonate), etc. may be formed. Likewise the corresponding saturated esters such as ethylene glycol bis (methyl carbonate), ethylene glycol bis (ethyl carbonate), ethylene glycol bis (propyl carbonate), etc. may be produced. In addition resinous condensation products may be produced by reaction of polyhydric alcohols with polychloroformates. Thus ethylene glycol dichloroformate or the corresponding polychloroformates may be heated in the presence of a basic agent such as described above with ethylene, propylene or butylene glycol, or resorcinol, cresol, phthalyl alcohol, tartaric acid or esters thereof, or other polyhydroxy compound to form an alkyd type of resin.

Other di-, or trichloroformates or other polychloroformates such as resorcinol trichloroformate may be reacted with methyl, ethyl, allyl, propyl, methallyl, etc. alcohols to form esters which may be resinous in nature if polyhydric alcohols are utilized.

In addition some of these same compounds may be produced by the reaction of a haloformate of a monohydric alcohol such as ethyl chloroformate with a dihydric alcohol such as ethylene glycol to form the carbonate. Other carbonates which may be produced are those obtained from the reaction of a haloformate of a monohydric alcohol such as propyl chloroformate with a monohydric alcohol such as ethyl, propyl, oleyl, n-octyl, stearyl, lauryl or 2 ethyl hexyl alcohols, etc.

In the production of the carbamates, the haloformates or polyhaloformates are reacted with amines in place of the alcohols and the remaining haloformate halogen removed in accordance with this invention. The carbamates which may be prepared are of the general structure

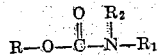

$R_1$ and $R_2$ are radicals of a primary or secondary amine

$R_1$ or $R_2$ may be hydrogen, but either $R_1$ or $R_2$ or both are alkyl, aryl, alicyclic, aralkyl monovalent radicals usually containing 1 to 18 carbon atoms, the nitrogen being linked directly to the carbon. Primary amines such as methyl, ethyl, n-butyl, allyl, vinyl, etc., amine or secondary amines such as dimethyl, diethyl, phenyl-ethyl, methyl-ethyl, dibutyl, etc., amine may be used. Also a diamine may be reacted with a chloroformate to give a product containing a chloroformate linkage as previously defined.

In addition, a carbamate may be prepared by reaction of carbamyl halide such as carbamyl chloride with a monohydric alcohol such as ethyl alcohol and residual hydrolyzable or chloroformate chlorine removed as herein contemplated. Typical of these carbamates are methyl, ethyl, vinyl, allyl, etc., carbamates of the monohydric alcohols disclosed above.

The following are illustrative examples of the invention:

Example I

A one liter three-necked flask containing 231 grams (1 mol) diethylene glycol bis (chloroformate) and 162.8 grams (2 mol+10%) butyl alcohol was fitted with a duo-blade nickel stirrer, thermometer and caustic spray device. The flask and contents were cooled in an ice-salt bath to 0° C. and 176 grams (2 mol+10%) of an aqueous caustic soda solution containing 50% by weight NaOH was sprayed into the mixture at the rate 1 to 3 grams per minute while maintaining the temperature below 5° C. After 176 grams of caustic solution had been added, a 20 cc. sample of the mixture was washed 4 times with distilled water and analyzed for chloroformate chlorine which was found to be 2.5% by weight of the mixture. As the chlorine content was still too high, 10 cc. of the 50% caustic soda solution was added and stirring was continued for ½ hour. This process was repeated twice until a chlorine content of 0.18% by weight of the mixture was obtained. Then 20 cc. of concentrated aqueous ammonium hydroxide containing 28% by weight of NH4OH (approximately 10 times the theoretical equivalent of chlorine) was added and the mixture was stirred for 15 minutes. At the end of this period 300 cc. of benzene was added to the mixture and the organic phase was washed three times with distilled water. The benzene was distilled out and the mixture was heated up to 150° C. at an absolute pressure of 3 millimeters of mercury. A yield of clear colorless diethylene glycol bis (butyl carbonate) was obtained. The chloroformate chlorine content of the ester was less than 0.001% by weight.

Example II

Into a 4-liter beaker was placed 551.3 grams of di-n-butylamine and 360 grams of sodium bicarbonate. Enough ice was added to maintain the temperature below 10° C. With vigorous stirring, 494.3 grams of diethylene glycol bis (chloroformate) was slowly added. Ice was added to the mixture to keep the temperature below 10° C. After the addition of the chloroformate was complete, the mixture was allowed to stand with stirring for one hour. At the end of this period, carbon dioxide continued to be evolved and approximately 100 grams additional NaHCO3 was added and the mixture was allowed to stand over night. The reaction mixture was transferred to a separatory funnel and 1 liter of ethylene dichloride was added. This mixture was washed with water. The ethylene dichloride was distilled off and the mixture was heated to 150° C. at an absolute pressure of 3 millimeters of mercury. The product contained approximately 0.14% by weight of chloroformate chlorine. Then 20 cc. of concentrated aqueous ammonium hydroxide solution containing 28% by weight of NH4OH (approximately 10 times the theoretical equivalent of chlorine) was added and the mixture was stirred for 15 minutes. The chloroformate chlorine after the NH4OH treatment was less than 0.001% by weight.

Example III

By the method described in Example I butoxyethyl alcohol was reacted with diethylene glycol bis (chloroformate) to prepare 198 grams of butoxyethyl diglycol carbonate containing 0.08% by weight of chlorine. After stirring for 20 minutes, 4 cc. of concentrated aqueous ammonium hydroxide solution containing 28% by weight of NH4OH (approximately 10 times the theoretical equivalent of chlorine) was added and the reaction mixture was let stand with stirring for an additional 15 minutes. The mixture was washed with distilled water three times and then heated to 150° C. at an absolute pressure of 3 millimeters of mercury. The chlorine content after the NH4OH treatment was less than 0.001% by weight.

Although the present invention has been described with reference to certain examples of compounds in general groups, it is not intended that such compounds alone shall be regarded as limited upon the scope of the invention except so far as included in the accompanying claims.

What is claimed is:

1. In the process of preparing a carbonate ester by reacting a haloformate with an alcohol whereby the carbonate ester containing haloformate halogen as an impurity is obtained, the improvement which comprises removing haloformate halogen from the carbonate ester by contacting the ester with a compound selected from a group consisting of ammonia and ammonium compounds which will liberate ammonia for reaction with HCl and removing the resultant halide which is formed.

2. In the process of preparing a carbonate ester by reacting a chloroformate with an alcohol whereby the carbonate ester containing chloroformate chlorine is obtained, the improvement which comprises removing chloroformate chlorine from the carbonate ester by contacting the ester with a compound selected from a group consisting of ammonia and ammonium compounds which will liberate ammonia for reaction with HCl and removing the resultant chloride which is formed.

3. In the process of preparing a carbonate ester by reacting a chloroformate with an alcohol whereby the carbonate ester containing chloroformate chlorine is obtained, the improvement which comprises removing chloroformate chlorine from the carbonate ester by contacting the ester with ammonium hydroxide and removing the resultant chloride which is formed.

4. A method of preparing diethylene glycol bis (butoxyethyl carbonate) which comprises reacting 2,n-butoxyethyl alcohol with diethylene glycol bis (chloroformate) to cause formation of the said carbonate and then removing residual chloroformate chlorine in said carbonate by mixing the carbonate with a compound selected from a group consisting of ammonia and ammonium compounds which will liberate ammonia for reaction with HCl.

5. A method of preparing a carbonate ester which comprises reacting a chloroformate with an alcohol to cause formation of said carbonate ester and then removing residual chloroformate chlorine in said carbonate ester by mixing the carbonate ester with a compound selected from a group consisting of ammonia and ammonium compounds which will liberate ammonia for reaction with HCl to react with the chloroformate chlorine.

6. A method of purifying a carbonate ester containing residual chloroformate which comprises contacting the ester with a compound selected from a group consisting of ammonia and ammonium compounds which will liberate ammonia for reaction with HCl and removing the resultant chloride.

7. In the process of preparing a carbonate ester by reacting a haloformate with an alcohol whereby the carbonate ester containing haloformate halogen as an impurity is obtained, the improvement which comprises partially removing the haloformate halogen by treating the carbonate ester with a basic metal compound and further removing the haloformate halogen from the carbonate ester by contacting the ester with a compound selected from a group consisting of ammonia and ammonium compounds which will liberate ammonia for reaction with HCl and removing the resultant halide which is formed.

8. In the process of preparing a carbonate ester by reacting a haloformate with an alcohol whereby the carbonate ester containing haloformate halogen as an impurity is obtained, the improvement which comprises partially reducing the haloformate halogen content of the carbonate ester by treating the carbonate ester with a basic metal compound and further reducing the haloformate halogen content of the carbonate ester to a concentration of less than one-tenth of a percent by weight of the carbonate ester by contacting the ester with a compound selected from a group consisting of ammonia and ammonium compounds which will liberate ammonia for reaction with HCl and removing the resultant halide which is formed.

LESTER E. BOHL.

REFERENCES CITED

The following references are of record in the file of this patent:

UNITED STATES PATENTS

| Number | Name | Date |
|---|---|---|
| 2,197,479 | Meigs | Apr. 16, 1940 |
| 2,254,283 | Gundel | Sept. 2, 1941 |
| 2,261,169 | Lott | Nov. 4, 1941 |
| 2,337,172 | Wojcik | Dec. 21, 1943 |
| 2,370,588 | Strain | Feb. 27, 1945 |
| 2,374,789 | Strain | May 1, 1945 |
| 2,408,893 | Swan et al. | Oct. 8, 1946 |